(12) United States Patent
Passerini et al.

(10) Patent No.: US 7,849,273 B2
(45) Date of Patent: Dec. 7, 2010

(54) TECHNIQUES FOR TIME-DEPENDENT STORAGE MANAGEMENT WITH A PORTABLE APPLICATION PROGRAMMING INTERFACE

(75) Inventors: Ronald Peter Passerini, Somerville, MA (US); Robert Warren Perry, Leominster, MA (US); Christopher Angelo Rocca, Burlington, MA (US); Michael Daniel Anthony, Wilmington, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 11/549,428

(22) Filed: Oct. 13, 2006

(65) Prior Publication Data

US 2007/0088922 A1   Apr. 19, 2007

Related U.S. Application Data

(60) Provisional application No. 60/726,193, filed on Oct. 14, 2005.

(51) Int. Cl.
*G06F 12/00* (2006.01)
(52) U.S. Cl. .................. 711/154; 711/111; 711/112; 706/919

(58) Field of Classification Search ............ 711/112, 711/154, 162; 714/6; 706/919
See application file for complete search history.

(56) References Cited

U.S. PATENT DOCUMENTS

| | | | |
|---|---|---|---|
| 7,133,993 B1* | 11/2006 | Jackson et al. | 711/172 |
| 2003/0046260 A1* | 3/2003 | Satyanarayanan et al. | 707/1 |
| 2003/0167270 A1* | 9/2003 | Werme et al. | 707/10 |
| 2004/0003171 A1* | 1/2004 | Basham et al. | 711/111 |
| 2005/0076264 A1* | 4/2005 | Rowan et al. | 714/6 |
| 2007/0022144 A1* | 1/2007 | Chen | 707/204 |

* cited by examiner

*Primary Examiner*—Yong Choe
(74) *Attorney, Agent, or Firm*—Hunton & Williams LLP

(57) ABSTRACT

Techniques for time-dependent storage management with a portable application programming interface are disclosed. In one particular exemplary embodiment, the techniques may be realized as a method for time-dependent storage management. The method may comprise interfacing with a host and a storage system having one or more storage devices. The method may also comprise intercepting all write commands that the host issues to the storage system. The method may additionally comprise performing a copy-on-write operation for each intercepted write command, wherein copy-on-write data and metadata associated with each intercepted write command are recorded, the metadata including at least a timestamp associated with each intercepted write command.

13 Claims, 3 Drawing Sheets

TECHNIQUES FOR TIME-DEPENDENT STORAGE MANAGEMENT WITH A PORTABLE APPLICATION PROGRAMMING INTERFACE

CROSS-REFERENCE TO RELATED APPLICATIONS

This patent application claims priority to U.S. Provisional Patent Application No. 60/726,193, filed Oct. 14, 2005, which is hereby incorporated by reference herein in its entirety.

This patent application is related to U.S. patent application Ser. No. 10/924,652, filed Aug. 24, 2004, which is a continuation-in-part of U.S. patent application Ser. No. 10/668,833, filed Sep. 23, 2003, each of which is hereby incorporated by reference herein in its entirety.

FIELD OF THE DISCLOSURE

The present disclosure relates generally to data storage and, more particularly, to techniques for time-dependent storage management with a portable application programming interface.

BACKGROUND OF THE DISCLOSURE

In related U.S. patent application Ser. Nos. 10/924,652 and 10/668,833, time-dependent data storage and recovery techniques are disclosed. Embodiments of such techniques provide solutions for continuous data protection (CDP) wherein all write commands directed to a storage system are intercepted by a storage management system having a current store and a time store. The current store may maintain or have access to a current (or mirror) copy of the storage system digital content. In one embodiment, the current store may be presented to the storage system as primary volumes. In another embodiment, the current store may be presented as secondary volumes, which are referred to as "TimeSafe volumes." The time store may record information associated with each intercepted write command, such as new data in the write command's payload or old data to be overwritten in response to the write command. Recordation of the new or old data in response to a write command may be referred to as a copy-on-write (COW) operation, and the new and/or old data recorded may be referred to as COW data. The time store may also record other information (i.e., metadata) associated with an intercepted write command and/or the corresponding COW operation, such as, for example, a timestamp, an original location in the current store (or TimeSafe volumes) where the old data are overwritten, and a destination location in the time store to which the COW data are copied.

FIG. 1 shows a system diagram illustrating an exemplary time-dependent storage management system 10 in relation to a storage system 12 and hosts/servers 102. The storage system 12 presents primary volumes 104 to the hosts/servers 102, and a current store 108 in the storage management system 10 presents TimeSafe volumes (secondary volumes) 106 to the hosts/servers 102. When the primary volumes 104 receive input/output (I/O) requests from the hosts/servers 102, write requests may be simultaneously forwarded to or intercepted by the storage management system 10. COW operations may cause backup data to be recorded in a time store 110 in the storage management system 10, and a mirror/current copy of the digital content of the storage system 12 may be maintained in the current store 108.

Each COW operation typically backs up one or more blocks of COW data, thereby creating one set of COW data and corresponding metadata. Over a period of time, multiple sets of COW data and corresponding metadata (including timestamps) may be accumulated as a collection of historical records of what has been written or overwritten in the current store 108 or the storage system 12. The content of the time store 110 may be further indexed (e.g., in "indexing tables") based on the metadata to facilitate efficient access to the COW data.

With a current copy of the digital content of the storage system 12 in the current store 108 and the historical records in the time store 110, the storage management system 10 adds a new dimension, i.e., time, to the storage system 12. Assuming the storage management system has been operatively coupled to the storage system since a past time, the storage management system 10 may quickly and accurately restore any addressable content in the storage system 12 to any point in time between the past time and a present time. For example, the storage management system 10 may be capable of providing a copy of the digital content of the storage system 12 (or a portion thereof) that existed at a specified past time $T_1$. The copy at time $T_1$ may be presented in the form of a virtual disk known as a "time image." The storage management system 10 may also be capable of instantly restoring the storage system 12 (or a portion thereof) to a state as it existed at a specified past time $T_2$, which operation is referred to as an "instant restore." The instant restore may be either non-destructive or destructive depending on whether the data overwritten during the restoration are recorded in the time store 110 or discarded. A time image or a TimeSafe LUN (logical unit) in an instant restore mode may continue to receive I/O requests, such as reads and writes. Such I/O requests may be referred to as "time image reads" and "time image writes" if directed to a time image, or "instant restore reads" and "instant restore writes" if directed to a TimeSafe LUN in an instant restore mode.

There are a wide variety of implementation options for the above-described CDP method. FIG. 2 shows one exemplary implementation wherein a storage management system 206 is operatively coupled to both a host 202 and a storage system 204. The storage management system 206 may or may not be positioned in a critical data path 20 between the host 202 and the storage system 204. If it is not in the critical data path 20, the storage management system 206 may be switched into a "capture mode" whenever it is desirable for it to intercept communications between the host 202 and the storage system 204. The storage management system 206 is typically implemented with a hardware appliance having one or more processor modules 208, wherein each processor module 208 performs a series of operations such as, for example, data interception, data replication, record creation, and metadata indexing.

The above-described hardware-based implementation of time-dependent storage management is highly dependent upon specifics of underlying operating systems and/or hardware configurations. Such hardware dependencies often lead to compatibility and interoperability issues that limit the environments in which such a hardware-based storage management system may be deployed. Due to platform-specific restrictions, the time-dependent data storage and recovery functionalities may not be portable to different platforms and may not be easily adapted to system/hardware upgrades.

In view of the foregoing, it would be desirable to provide a solution for data storage management which overcomes the above-described inadequacies and shortcomings.

SUMMARY OF THE DISCLOSURE

Techniques for time-dependent storage management with a portable application programming interface are disclosed. In one particular exemplary embodiment, the techniques may be realized as a method for time-dependent storage management. The method may comprise interfacing with a host and a storage system having one or more storage devices. The method may also comprise intercepting all write commands that the host issues to the storage system. The method may additionally comprise performing a copy-on-write operation for each intercepted write command, wherein copy-on-write data and metadata associated with each intercepted write command are recorded, the metadata including at least a timestamp associated with each intercepted write command.

In accordance with other aspects of this particular exemplary embodiment, the method may further comprise communicating with the host and the storage system via an application programming interface, the application programming interface comprising a plurality of software objects that provide: an inter-process communication mechanism; one or more data buffers that hold data from the host; a mechanism for manipulation of the one or more data buffers; a plurality of I/O sources representing the host and the one or more storage devices; and an I/O router that execute I/O requests against the one or more storage devices.

In accordance with further aspects of this particular exemplary embodiment, the application programming interface may be implemented on a computing platform that provides one or more libraries selected from a group consisting of: POSIX thread library, POSIX C library, and ANSI C++ library.

In accordance with additional aspects of this particular exemplary embodiment, the application programming interface may be implemented on a computing platform that provides an ANSI compliant C/C++ compiler. The ANSI compliant C/C++ compiler may be part of a GNU compiler collection.

In accordance with another aspect of this particular exemplary embodiment, the application programming interface may be implemented on a computing platform that supports a Berkeley database.

In accordance with yet another aspect of this particular exemplary embodiment, the application programming interface may support high availability by causing at least one of the plurality of I/O sources to replay an I/O request that has been interrupted due to a failover.

In another particular exemplary embodiment, the techniques may be realized as at least one signal embodied in at least one carrier wave for transmitting a computer program of instructions configured to be readable by at least one processor for instructing the at least one processor to execute a computer process for performing the method as recited above.

In yet another particular exemplary embodiment, the techniques may be realized as at least one processor readable carrier for storing a computer program of instructions configured to be readable by at least one processor for instructing the at least one processor to execute a computer process for performing the method as recited above.

In still another particular exemplary embodiment, the techniques may be realized as an article of manufacture for time-dependent storage management. The article of manufacture may comprise at least one processor readable carrier and instructions carried on the at least one carrier. The instructions may be configured to be readable from the at least one carrier by at least one processor and thereby cause the at least one processor to operate so as to: interface with a host and a storage system having one or more storage devices; intercept all write commands that the host issues to the storage system; and perform a copy-on-write operation for each intercepted write command, wherein copy-on-write data and metadata associated with each intercepted write command are recorded, the metadata including at least a timestamp associated with each intercepted write command.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
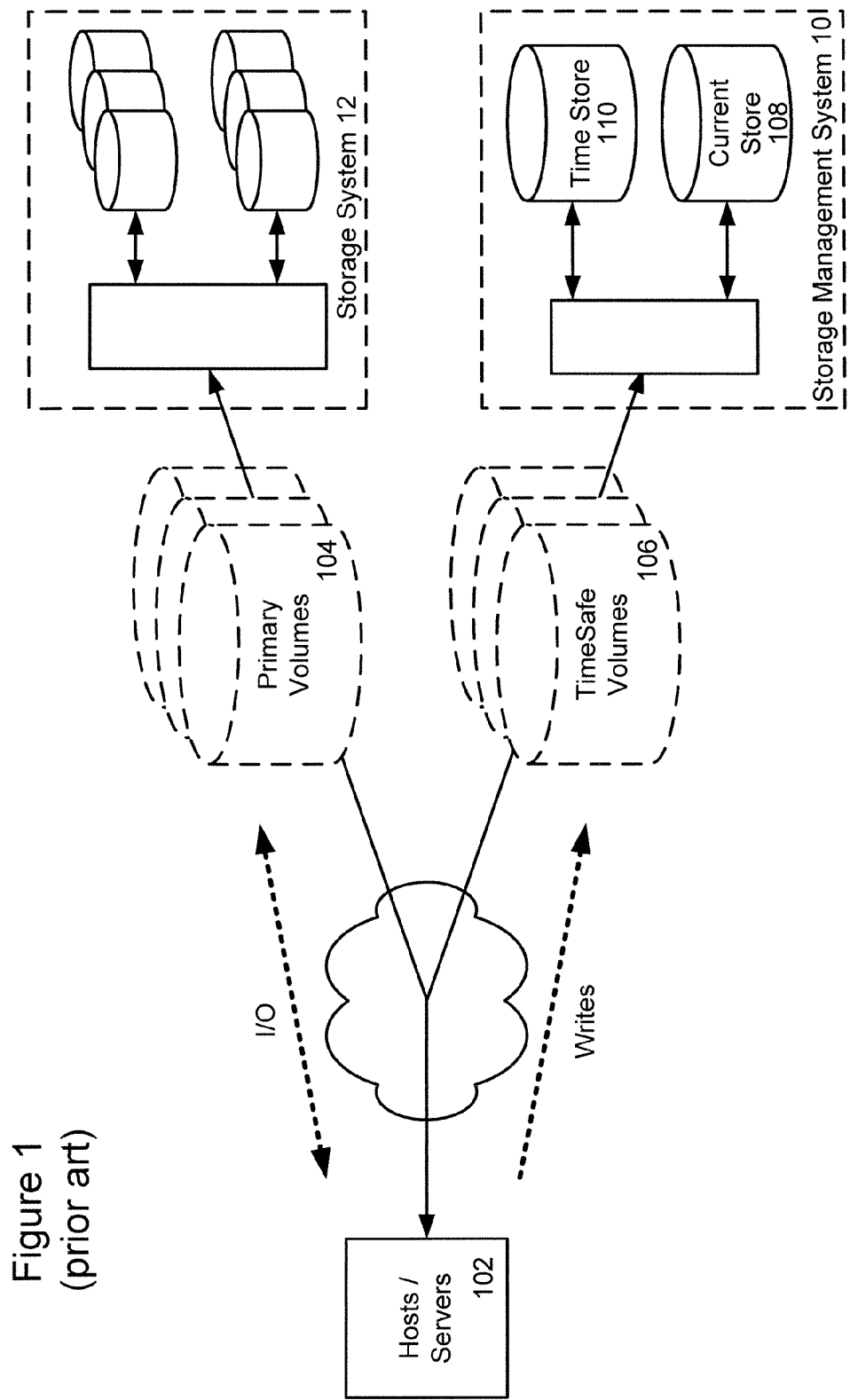
FIG. 1 shows a block diagram illustrating an exemplary time-dependent storage management system in relation to a storage system and hosts/servers.
Figure 2:
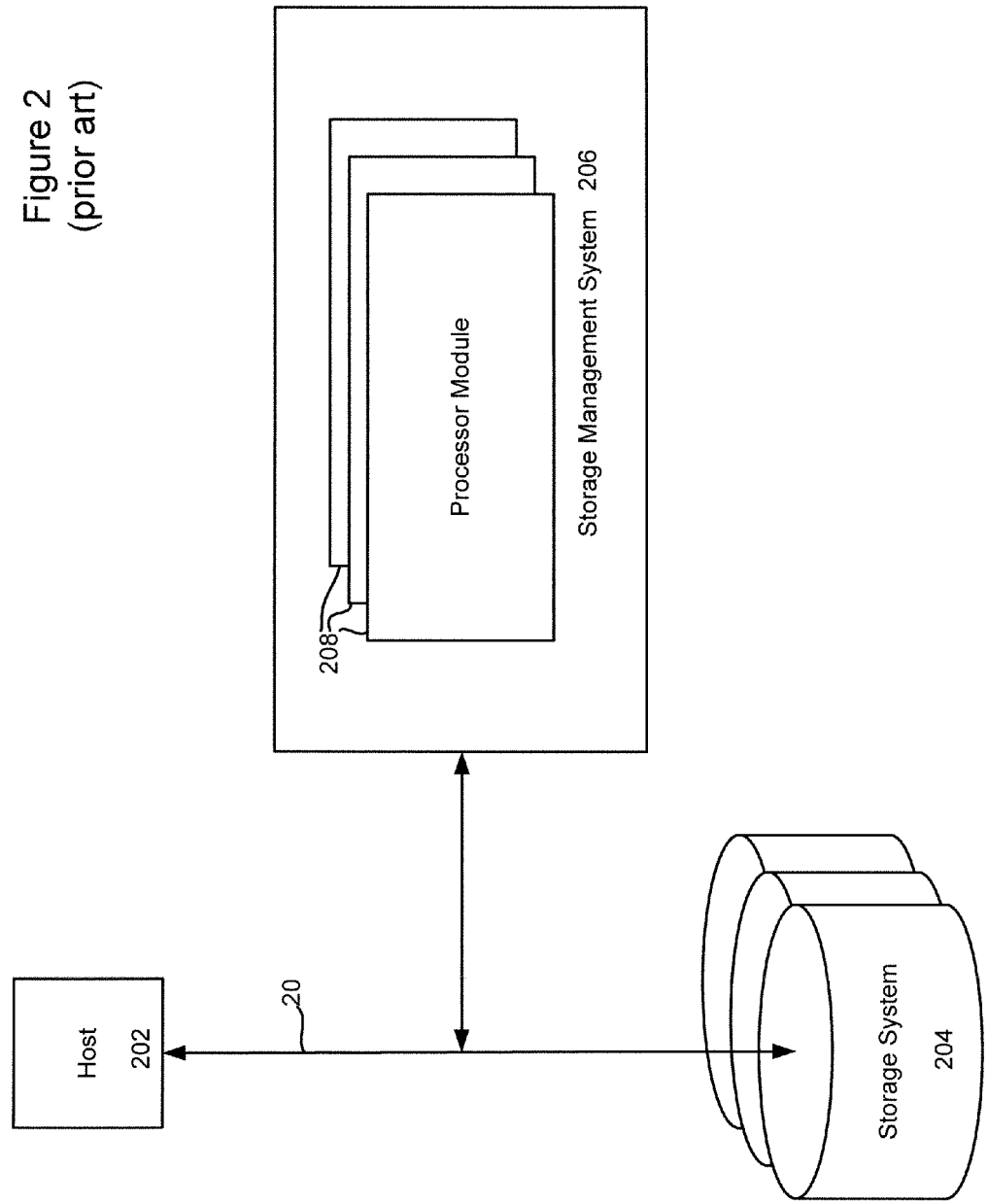
FIG. 2 shows a block diagram illustrating an exemplary hardware-based CDP system.

In the detailed description that follows, references will be made to embodiments of time-dependent data storage and recovery techniques such as those disclosed in U.S. patent application Ser. Nos. 10/924,652 and 10/668,833. It should be appreciated that embodiments of the present disclosure are easily adaptable to other data protection methods or systems that maintain historical records of digital content of a storage system.

A typical "storage system" may comprise one or more storage devices which may be physical, virtual or logical devices or a combination thereof. According to one embodiment, a storage system may comprise a storage area network (SAN) having one or more datasets, wherein each dataset may comprise one or more nodes, and wherein one or more logical units (LUNs) may be coupled to each node. Hereinafter, for ease of illustration, the term "storage system" may refer to an entire storage system or a portion (e.g., dataset or node) thereof.

As used herein, "backup data" refers generally to data that have been recorded and/or organized (or even re-organized) with a purpose of restoring or recovering digital content of a storage system.

"Copy-on-write data" (or "COW data") refers to substantive data (e.g., new data to be written or old data to be overwritten in response to a write command) that have been recorded in a copy-on-write operation. New data to be written in response to a write command are sometimes referred to as "after image data" or "after image," while old data to be overwritten in response to a write command are sometimes referred to as "before image data" or "before image."

"Corresponding metadata" or "metadata" refer to informational data (e.g., timestamps and storage addresses) regarding the associated COW data in a copy-on-write operation. Typically, one copy-on-write operation causes one set of COW data and corresponding metadata to be created. Despite their correlation, COW data and corresponding metadata may be stored in separate storage devices or segments.

Embodiments of the present disclosure provide techniques for software-based time-dependent storage management wherein an application programming interface (API) ensures compatibility and interoperability of CDP functionalities with various computing platforms (i.e., operating systems and/or hardware configurations). Hardware dependencies may be abstracted away by implementing a plurality of software object classes in the API. As a result, the CDP functionalities (hereinafter referred to collectively as a "Time Store Daemon" or "TSD") may be ported to any computing platform that meets a minimum set of requirements.

According to embodiments of the present disclosure, input requirements of a TSD may be defined in a general enough way to provide a virtual I/O indexing engine for which the dependencies on an underlying computing platform are substantially removed. The underlying computing platform may be based on, but not limited to, a Linux operating system and its associated POSIX API's. POSIX stands for portable operating system interface, with the X signifying its UNIX heritage. With the removal of hardware dependencies, the TSD may then operate on nearly any platform, as an engine for performing indexing of I/O requests and for generating time images and instant restores.

In order to support the TSD functionalities, an underlying operating system may need to meet a minimum set of requirements. According to embodiments of the present disclosure, it may be desirable to design the TSD to rely on platform libraries as little as possible. However, it may be impossible to eliminate the use of certain system calls. The libraries that the TSD may need in the underlying operating system may include one or more of the following: POSIX thread library (e.g., pthreads), POSIX C library (e.g., any standard UNIX-like libc), and ANSI C++ library (e.g., Standard Template Library and IOstreams). In one embodiment, the TSD may need to dynamically load libraries at run-time.

The underlying operating system (at least the one being compiled on) may have a fully ANSI-compliant C and/or C++ compiler. The C and/or C++ compiler may include a Standard Template Library (STL) and IOstreams package. Since the TSD typically makes extensive use of templates and other C++ features, it may be desirable to port the TSD to a platform with an ANSI-compliant compiler. According to one embodiment, a GNU compiler collection (GCC) version 3.2.1 or higher or any equivalent C/C++ compiler may be employed. The GCC compiler may be advantageous since it runs almost everywhere.

A typical TSD indexing code may make use of at least two different database systems, such as, for example, Berkeley DB, which is available from Sleepycat Software, and/or MySQL, which is available from MySQL AB. An underlying operating system may need to be able to support either or both database systems depending on the actual database dependencies of the TSD.

The underlying operating system may present one or more types of file systems to the TSD. The MySQL and Berkeley DB databases may store information on file systems that the TSD relies on being available at start-up time. Since the databases may migrate from one node to another upon a node failure, it may be beneficial for the file systems to be installed on more than one host, even if it may be only one host at a time. The file systems may also be journaled, or may at least provide some method of crash consistency. The TSD may not need to do any file system level verification of the data.

The TSD API may comprise a collection of pure virtual base classes that define an interface that the TSD expects the underlying platform to provide. By deriving classes from these bases and implementing related methods, the TSD may operate as designed, as long as the underlying platform can provide the functionality specified in the method description below.

Figure 3:
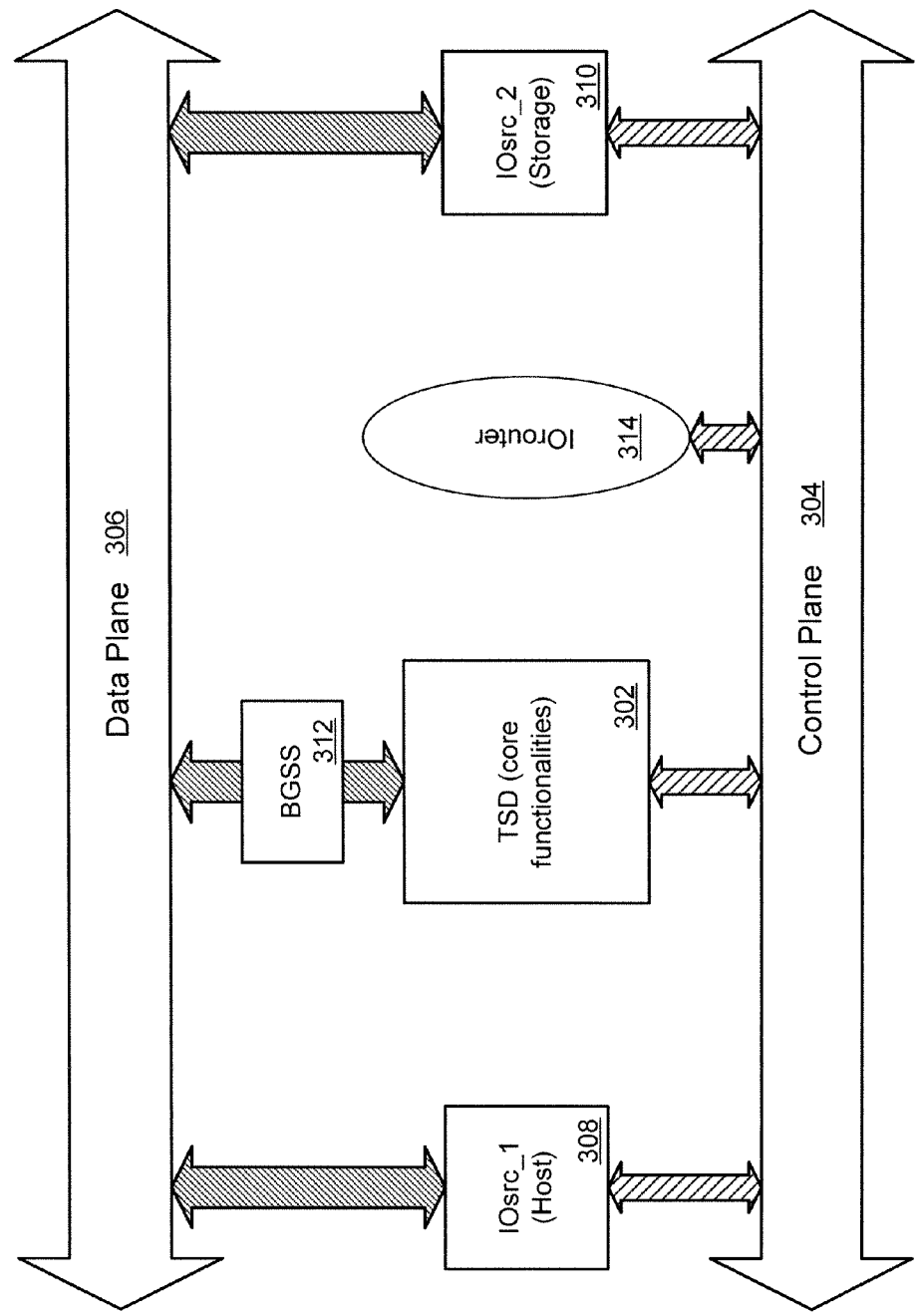
FIG. 3 shows a block diagram illustrating an exemplary set of software objects for time-dependent storage management in accordance with embodiments of the present disclosure.

FIG. 3 shows a block diagram illustrating an exemplary set of software objects for time-dependent storage management in accordance with embodiments of the present disclosure. The software objects may mimic a hardware environment seen by a TSD 302. The TSD 302 may represent core functionalities for time-dependent storage management. The software objects may include control plane 304, data plane 306, IOsrc_1 308, IOsrc_2 310, BGSS 312, and IOrounter 314. The IOsrc_1 308 may represent a host (server) with which the TSD 302 communicates. The IOsrc_2 310 may represent a storage system to which the IOsrc_1 308 issues I/O requests. The control plane 304 may provide an inter-process communication mechanism that passes messages between the TSD 302 and other devices or entities. The BGSS (buffered group server source) 312 may represent a source from which data buffers may be requested from. The data plane 306 may provide a mechanism for manipulation of the data buffers. The IOrouter 314 may execute I/O requests against one or more storage devices represented by the IOsrc_2 310.

For a better understanding of techniques for software-based time-dependent storage management, exemplary implementation details are provided below.

According to one embodiment, the following software object classes may be defined:

ControlPlaneImpl—defines how to pass data structures into and out of the TSD;

DataPlaneImpl—defines how to manipulate the data buffers (host data);

IOsrcImpl—defines a source to get I/O requests from or a target to send I/O requests to;

IORouterImpl—defines an asynchronous block I/O device interface;

BGSSImpl—defines a source to request a private pool of data buffers from.

This set of software object classes may mimic a hardware-based time-dependent storage management system. In addition, the API may be generic enough so that it may allow the TSD to run on most UNIX-like systems with minimal modifications.

The ControlPlaneImpl class may represent an inter-process communication (IPC) mechanism in the TSD. An internal class ControlPlane that may be used throughout the TSD may boil all its functionality down into a few methods that are supplied by the underlying ControlPlaneImpl class. Note that it may not be necessary for the ControlPlaneImpl to rely entirely on IPC. If all relevant information can be obtained from a local process, e.g., via system calls, or some other mechanism, then, as long as it conforms to this API, the TSD may run correctly.

Structures and/or classes related to the ControlPlaneImpl class may include MDPacket, cp_msg_t, group_name_t, and cp_send_req_t as described below.

MDPacket may be the TSD's abstraction of the mdp_t data type. MDPacket may involve setter and getter methods for all the mdp_t fields, and some utility functions. MDPacket may contain references (or pointers) to actual data buffers instead of the data buffers themselves.

cp_msg_t may represent a message received via the control plane from the TSD. According to one embodiment, cp_msg_t may contain either an opaque array of bytes represented as a void pointer and a length, or a pointer to an MDPacket structure.

group_name_t may be an abstraction of a socket for the control plane to either listen on or send to. The group_name_t may be made up of two fields, an ID and an instance number. The ID may be a unique number (e.g., 16-bit) that may be well known to both the sender and receiver, which may be analogous to a port number in networking. The instance number may be a node ID (16-bit). Between these two, it may be possible to send a message to a particular listener on a particular node.

cp_send_req_t may be a data structure that contains all the information relevant to sending a message. It may contain the message, the address to send it to, a callback function to be called when the message is in the recipients queue, and a void pointer for user data to be passed back via the callback. When cp_msg_t gets abstracted, cp_send_req_t may be subsumed into the cp_msg_t class.

There may be a number of requirements or assumptions associated with the ControlPlaneImpl class.

The control plane may assure ordered delivery of messages such that the messages arrive at the TSD in the same order that the sender sent them. The control plane may have a flow control mechanism so that messages will not get lost if the TSD cannot pull them off an incoming queue fast enough, e.g., during a configuration change. The control plane may also include a callback notification mechanism. The TSD may expect to receive a previously registered callback when there is a message ready to pick up. This callback may occur on a thread not otherwise owned by the TSD. According to some embodiments, it may be desirable for ControlPlaneImpl to create its own thread to perform the callbacks on.

The MDPacket's may be delivered via the control plane mechanism. The delivery does not necessarily require standard IPC. The ControlPlaneImpl class may be responsible for getting the MDPacket's into the system.

The TSD may maintain a reference count on messages to manage their allocation and de-allocation. While the reference count could be built into the cp_msg_t directly via some smart pointer mechanism, it may be desirable to keep it outside of the message type. It may be assumed that messages received by the TSD have a reference count of 1 to start with.

According to one embodiment of the present disclosure, the ControlPlaneImpl class may be associated with the following public member functions:

virtual ~ControlPlaneImpl (void)
No special implementation needed.
virtual void bumpRefMsgLocal (cp_msg_t *message)=0
Increment the reference count of the message pointed to by 1.
virtual void freeMsgLocal (cp_msg_t *message)=0
Decrement the reference count of the message, by 1 and if it hits 0, frees it.
virtual void send (cp_send_req_t *send_req)=0
Send the message using the data provided in the send_req.

The callback may be asynchronous and indicate that the message may be in the receiver's queue.

virtual void registerReceiver (const group_name_t *group_name, int ordered, int bufs_per_sender, int slop_bufs)=0

This may be the first step in listening for control plane messages. Ordered may be always 1 in the TSD, as it requires the messages (metadata packets) to arrive in the order they were sent. "bufs_per_sender" may be the number of outstanding messages that may be allowed in the pipe between this process and one other. The slop_bufs parameter represents the pool of messages that can be in the pipe that may be shared by all processes.

If a listener is registered, but not enabled, it may be in "shadow" mode, meaning it may not get callbacks for message delivery, but later could enable and start receiving callbacks for those which have not been already freed. This feature has been used in the past in the TSD for failover purposes.

virtual void enableReceiver (const group_name_t *group_name, cp_recvs_ready_cb recvs_ready_cb, void context, unsigned long max_msgs, unsigned long max_usecs)=0

This may be the second step in listening for control plane messages. The cp_recvs_ready_cb may be the extern "C" function to register as the callback function that gets called when a message is pending. The void * may be any user data, and may be passed into the callback. The max_msgs and max_usecs may be used as a batching feature. The callback may trigger either when max_msgs messages are in the queue, or after max_usecs microseconds have elapsed.

virtual void disableReceiver (const group_name_t *group_name)=0
Stop the callbacks registered in enableReceiver from happening.
virtual void deregisterReceiver (const group_name_t *group_name)=0
Stop listening for messages. It may be undefined what happens if it is not yet disabled.
virtual unsigned long getRecvdMsg (const group_name_t *group_name, cp_msg_t *msg)=0
Pull a single message from the queue. If there are no more messages, it returns a negative value.
virtual std::ostream & serialize (std::ostream &stream) const=0
Dump this object onto a standard C++ stream for logging or debug output.
virtual DebugStream & serialize (DebugStream &stream) const=0
Dump this object onto a special debug stream for debug output.

The ControlPlaneImpl class may also be associated with the following static public member functions:

static ControlPlaneImpl * Get (void)
This needs to be implemented to return an instance of the actual, concrete implementation of the ControlPlaneImpl. In other words, it should return a pointer to an instance of whatever class may be derived from this one to implement this interface. This is, in essence, a virtual constructor.
This may only be called once, during TSD startup.
static void Release (ControlPlaneImpl *impl)
Delete the object returned from the Get call.

The DataPlaneImpl class may provide a mechanism for the manipulation of data buffers (e.g., host data). The TSD may interact with the data plane as little as possible by design. The TSD may use methods listed below to facilitate clustered operation. The TSD may be the component with states of the I/O requests, so it has the information on when one or more portions of data buffers need to be replicated to another node, or when to mark buffers as being local to this node. The TSD may use the DataPlaneImpl class to do so.

Structures and/or classes related to the DataPlaneImpl class may include bg_t and group_name_t as described below.

bg_t may be an opaque type to the TSD and may represent a number of blocks of data for or from the host system. The TSD may not look in this structure at all.

group_name_t is described above in connection with ControlPlaneImpl.

There may be a number of requirements or assumptions associated with the ControlPlaneImpl class. For example, it may be required that that a bg_t represent a contiguous data buffer of a fixed size. An MDPacket may contain a C-style array of bg_t's to contain the entire host I/O data. The physical memory with the data buffer might not be on the same machine that may be processing the I/O request.

According to one embodiment of the present disclosure, the DataPlaneImpl class may be associated with the following public member functions:
 virtual ~DataPlaneImpl (void)
  No special implementation needed.
 virtual void *mapBuffer (bg_t *buffer, int force)=0
  Map a buffer into user memory. The force flag may be used to force a remote copy of the buffer to the local node in the case that it was not local to begin with.
 virtual int32_t unmapBuffer (void *mapping, bg_t *bg, int modified)=0
 Release a previously mapped buffer. The modified flag may be an optimization. If it is false (i.e., not modified), the data are not copied back into the buffer. If it is true (i.e., modified), the data are copied back.
 virtual int32_t setBufferState (bg_t *bg, int state)=0
  Mark a buffer's location in the system. State may be one of several enum's that relate to what part of the code the buffer was last seen in. These may be optional parameters.
 virtual int32_t replicate (bg_t *bg, uint16_t start, uint16_t size, uint16_t dest)=0
  Replicate contents of buffer to other nodes. Portions of a buffer can be replicated via the start and size parameters. "dest" may be the node ID of the destination node.
 virtual int32_t setLocal (bg_t *bg)=0
  Mark this buffer as being present on the local node.
 virtual int32_t decodeBufferDelivery (char *message, size_t size, bg_delivery_msg_t *delivery)=0
  Decode control plane message delivery into a buffer group delivery.
  The buffers on some other, different platform may not be delivered via the control plane. The logic behind this call should be hidden in the BGSS class in the TSD. In time, it may get moved and this should be updated. It should not be a large change.
 virtual int32_t tostring (group_name_t const &gname, std::string &str)=0
  This method may be used to transform a group_name_t data structure into a string representation. This may be used mainly during configuration of the TSD and in debugging or log output.
  This should be part of the ControlPlaneImpl class, as it may be the only part of the porting abstraction layer that uses the group_name_t. When the code gets changed, this should get updated.

virtual int32_t toGroupName (std::string const &str, group_name_t &gname)=0
  This method may be used to transform string representation of a group_name_t data structure back into the structure itself. This may be used mainly during configuration of the TSD.
  This should be part of the ControlPlaneImpl class, as it may be the only part of the porting abstraction layer that uses the group_name_t. When the code gets changed, this should get updated.
 virtual std::ostream & serialize (std::ostream &stream) const=0
  Dump this object onto a standard C++ stream for logging or debug output.
 virtual DebugStream & serialize (DebugStream &stream) const=0
  Dump this object onto a special debug stream for debug output.

The DataPlaneImpl class may also be associated with the following static public member functions:
 static DataPlaneImpl *Get (void)
  This needs to be implemented to return an instance of the actual, concrete implementation of the DataPlaneImpl. In other words, it should return a pointer to an instance of whatever class may be derived from this one to implement this interface. This is, in essence, a virtual constructor.
  This may only be called once, e.g., during TSD startup.
 static void Release (DataPlaneImpl *impl)
  Delete the object returned from the Get call.

The IOsrcImpl class in the TSD may represent system components that send I/O requests to the TSD, as well as the components that responses are sent back to before an I/O request is completed. The internal class IOsrcImpl in the TSD may boil its functionality down into a few methods as described below. Note that it may not be necessary for the IOsrcImpl to rely entirely on IPC. If all relevant information can be obtained from a local process, e.g., via system calls, or some other mechanism, then, as long as it conforms to this API, the TSD may run correctly.

Structures and/or classes related to the IOsrcImpl class may include MDPacket and ControlPlane::SendCB as described below.

MDPacket is described above in connection with ControlPlaneImpl.

ControlPlane::SendCB may be a C++ function object that acts as the callback that gets called when the IOsrcImpl receives the MDPacket. It may essentially be a pointer to a class that has a "sendComplete" method that is called when a "send" to an IOsrc object is complete.

There may be a number of requirements or assumptions associated with the IosrcImpl class. The I/O requests may be coming in on the control plane which is implemented in ControlPlaneImpl. Most of the IOsrcImpl code may be platform-independent, because it makes heavy use of the ControlPlaneImpl abstraction class. The only platform-dependant area may be the submission of responses back to an IOsrc object.

According to one embodiment of the present disclosure, the IOsrcImpl class may be associated with the following public member functions:
 virtual ~IOsrcImpl (void)
  No special implementation needed.
 virtual void submit (MDPacket *mdp, ControlPlane::SendCB *callback)=0
  This call may be made when an I/O request is complete and the TSD wants to send a response back to the related IOsrc object. It may be an asynchronous call, and the ControlPlane::SendCB function may be called as a callback.

virtual std::ostream & serialize (std::ostream &stream) const=0

Dump this object onto a standard C++ stream for logging or debug output.

virtual DebugStream & serialize (DebugStream &stream) const=0

Dump this object onto a special debug stream for debug output.

The IOsrcImpl class may also be associated with the following static public member functions:

static IOsrcImpl *Get (void)

This needs to be implemented to return an instance of the actual, concrete implementation of the IOsrcImpl. In other words, it should return a pointer to an instance of whatever class may be derived from this one to implement this interface. This is, in essence, a virtual constructor.

This may only be called once, e.g., during TSD startup.

static void Release (IOsrcImpl *impl)

Delete the object returned from the Get call.

The IORouterImpl class in the TSD may represent a system component that performs block-level asynchronous I/O requests. It may be also responsible for handling multipathing for the TSD. The internal class IORouterImpl in the TSD may boil all its functionality down into a few methods as described below.

Structures and/or classes related to the IORouterImpl class may include, e.g., mdp_t, which may be an MDPacket, as described above in connection with ControlPlaneImpl.

There may be a number of requirements or assumptions associated with the IORouterImpl class. The IORouterImpl may handle multipathing to the array-side storage. The IORouterImpl may forward requests to other TSD nodes when a LUN cannot be accessed locally.

According to one embodiment of the present disclosure, the IORouterImpl class may be associated with the following public member functions:

virtual ~IORouterImpl (void)

No special implementation needed.

virtual void send_mdp (mdp_t *mdp, void(*callback) (mdp_t *, void *), void *context)=0

This may be the call to perform the I/O request. It may be an asynchronous call and the callback provided may be called when the I/O request is complete, either because it succeeded, or because there was an error.

virtual void dumpIOLog (void)=0

Dump into the log the circular buffer of information about the I/O requests that have been processed recently.

This method may be only used for debugging and is not critical.

virtual std::ostream & serialize (std::ostream &stream) const=0

Dump this object onto a standard C++ stream for logging or debug output.

virtual DebugStream & serialize (DebugStream &stream) const=0

Dump this object onto a special debug stream for debug output.

The IORouterImpl class may also be associated with the following static public member functions:

static IORouterImpl *Get (void)

This needs to be implemented to return an instance of the actual, concrete implementation of the IORouterImpl.

In other words, it should return a pointer to an instance of whatever class may be derived from this one to implement this interface. This is, in essence, a virtual constructor.

This may only be called once, e.g., during TSD startup.

static void Release (IORouterImpl *impl)

Delete the object returned from the Get call.

The BGSSImpl class in the TSD may represent the component in the system that maintains the pool of data buffers (bg_t's). It may be able to dole some data out to the TSD when requested. The internal class BGSSImpl may boil all its functionality down into a few methods as described below. Note that it may not be necessary for the BGSSImpl to rely entirely on IPC. If all relevant information can be obtained from a local process, e.g., via system calls, or some other mechanism, then, as long as it conforms to this API, the TSD may run correctly.

Structures and/or classes related to the ControlPlaneImpl class may include group_name_t and bg_delivery_msg_t as described below.

group_name_t is described above in connection with ControlPlaneImpl. group_name_t may be used in the class to define control plane socket to listen on for BGSS delivery requests and the socket on the true BGSS device to send the release messages to.

bg_delivery_msg_t may represent a delivery of bg_t's from the BGSS. bg_delivery_msg_t may contain an array of bg_t's and the number of them in the array.

There may be a number of requirements or assumptions associated with the BGSSImpl class. It may be assumed that the buffer delivery mechanism may be the control plane. However, this is not necessarily a hard requirement. Buffer delivery may take place via channels other than the control plane.

According to one embodiment of the present disclosure, the BGSSImpl class may be associated with the following public member functions:

virtual ~BGSSImpl (void)

No special implementation needed.

virtual int32_t requestBuffers (uint32_t const &num_buffers, bg_delivery_msg_t *&delivery, timespec *timeout)=0

This call allocates num_buffers buffers and puts the result into a bg_delivery_msg_t that has been allocated on the heap. The bg_delivery_msg may be freed when passed to releaseBuffers.

This may be a blocking call, so the timeout parameter may be used as an absolute time at which to timeout the call, in the case that the BGSS object never responds.

It may return 0 on success and −1 on failure.

virtual void releaseBuffers (bg_delivery_msg_t *delivery) =0

Release a previously allocated request. This both returns the buffers back to the BGSS and frees the memory pointed to by delivery.

virtual void handleDelivery (bg_delivery_msg_t *delivery)=0

This may be the method that may get called when the control plane delivers a batch of bg_t's. In other words, the BGSS object may send a request via the control plane to the true BGSS device and wait for a response. This may be the call that may be made to indicate that the delivery has arrived.

virtual std::ostream & serialize (std::ostream &stream) const

Dump this object onto a standard C++ stream for logging or debug output.
virtual DebugStream & serialize (DebugStream &stream) const
Dump this object onto a special debug stream for debug output.

The BGSSImpl class may also be associated with the following static public member functions:
static BGSSImpl * Get (group_name_t const &bgss_port, group_name_t const &tsd_port)
This needs to be implemented to return an instance of the actual, concrete implementation of the BGSSImpl. In other words, it should return a pointer to an instance of whatever class may be derived from this one to implement this interface. This is, in essence, a virtual constructor.
This may only be called once, e.g., during TSD startup.
static void Release (BGSSImpl *impl)
Delete the object returned from the Get call.

The BGSSImpl may also provide the following protected attributes:
group_name_t const _bgss
This makes available to the derived class the group_name_t to send control plane messages to the BGSS object to request buffers. The BGSSImpl class sets it.
group_name_t const _tsd
This makes available to the derived class the group_name_t that the TSD may be listening on for control plane responses to buffer requests. The BGSSImpl class sets it.

The TSD may be designed to run as part of a highly available appliance. As such, it may pose some requirements for the other components in the system in order to function properly.

For example, it may be required that if a TSD dies and another TSD picks up its work, the IOsrc may replay all I/O requests that were still outstanding on the other TSD when it died. It may also set some flag in the MDPacket to indicate that this may be a replayed MDPacket. While this may be not strictly necessary, it greatly simplifies the code in the TSD if it does not have to figure out which ones are replays and which are not.

The TSD may also require that some external entity, e.g., a Workload Manager, assign it LUNs during a failover scenario. One TSD does not know of the existence of any other TSD, so it uses a push method to get the list of LUNs it is processing.

It may also be assumed that if it is an IOsrc node that has failed, that the TSD will not get errors when sending the responses to the in-flight I/O requests back to the now non-existent IOsrc node.

The TSD's interaction with configuration is preferably kept to a minimum. There may be still certain aspect of the code that interact with the configuration model objects directly, and assume some sort of callback-driven configuration mechanism. It is possible to completely abstract out configuration information, as has been done with the platform pieces in the same manner. It should only take some code reorganization and a new set of *Impl classes may be created to represent a callback-driven configuration, and some other configuration objects.

Alerts may be another area of the management stack that may or may not be abstracted out. As with configuration, it may take some, but not a lot of work to issue alerts through an abstract interface.

Current tracing package in the TSD is the platform tracing package which may be very dependent on specific platforms. Codes related to tracing may be written in x86 assembly language that assumes a Linux kernel and other non-portable things. Such platform dependencies may need to be removed when porting the tracing functionality to another platform.

At this point it should be noted that the technique for time-dependent storage management with a portable application programming interface in accordance with the present disclosure as described above typically involves the processing of input data and the generation of output data to some extent. This input data processing and output data generation may be implemented in hardware or software. For example, specific electronic components may be employed in a storage area network (SAN) or similar or related circuitry for implementing the functions associated with time-dependent storage management in accordance with the present disclosure as described above. Alternatively, one or more processors operating in accordance with stored instructions may implement the functions associated with time-dependent storage management in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for time-dependent storage management, the method comprising:
interfacing with a host and a storage system having one or more storage devices;
intercepting all write commands that the host issues to the storage system; and
recording data and metadata associated with each intercepted write command, the metadata including at least a timestamp associated with each intercepted write command;
wherein interfacing with the host and the storage system is performed via an application programming interface comprising a plurality of software objects that provide a plurality of I/O sources representing the host and the one or more storage devices;
wherein the plurality of software objects further provide a control plane object to provide an inter-process communication mechanism, a data buffer object representing a source from which to request data buffers, a data plane object to provide a mechanism for manipulation of the data buffers, and an I/O router object to execute I/O requests against the one or more storage devices represented by at least one of the I/O sources.

2. The method according to claim 1, wherein the application programming interface is implemented on a computing platform that provides one or more libraries selected from a group consisting of: POSIX thread library, POSIX C library, and ANSI C++ library.

3. The method according to claim 1, wherein the application programming interface is implemented on a computing platform that provides an ANSI compliant C/C++ compiler.

4. The method according to claim 3, wherein the ANSI compliant C/C++ compiler is part of a GNU compiler collection.

5. The method according to claim 1, wherein the application programming interface is implemented on a computing platform that supports a Berkeley database.

6. The method according to claim 1, wherein the application programming interface supports high availability by causing at least one of the plurality of I/O sources to replay an I/O request that has been interrupted due to a failover.

7. At least one non-transitory processor readable storage medium for storing a computer program of instructions configured to be readable by at least one processor for instructing the at least one processor to execute a computer process for performing the method as recited in claim 1.

8. An article of manufacture for time-dependent storage management, the article of manufacture comprising:
at least one non-transitory processor readable storage medium; and
instructions carried on the at least one non-transitory processor readable storage medium;
wherein the instructions are configured to be readable from the at least one non-transitory processor readable storage medium by at least one processor and thereby cause the at least one processor to operate so as to:
interface with a host and a storage system having one or more storage devices;
intercept all write commands that the host issues to the storage system; and
record data and metadata associated with each intercepted write command, the metadata including at least a timestamp associated with each intercepted write command;
wherein interfacing with the host and the storage system is performed via an application programming interface comprising a plurality of software objects that provide a plurality of I/O sources representing the host and the one or more storage devices;
wherein the plurality of software objects further provide a control plane object to provide an inter-process communication mechanism, a data buffer object representing a source from which to request data buffers, a data plane object to provide a mechanism for manipulation of the data buffers, and an I/O router object to execute I/O requests against the one or more storage devices represented by at least one of the I/O sources.

9. The article of manufacture according to claim 8, wherein the application programming interface is implemented on a computing platform that provides one or more libraries selected from a group consisting of: POSIX thread library, POSIX C library, and ANSI C++ library.

10. The article of manufacture according to claim 8, wherein the application programming interface is implemented on a computing platform that provides an ANSI compliant C/C++ compiler.

11. The article of manufacture according to claim 10, wherein the ANSI compliant C/C++ compiler is part of a GNU compiler collection.

12. The article of manufacture according to claim 8, wherein the application programming interface is implemented on a computing platform that supports a Berkeley database.

13. The article of manufacture according to claim 8, wherein the application programming interface supports high availability by causing at least one of the plurality of I/O sources to replay an I/O request that has been interrupted due to a failover.

* * * * *